Patented May 14, 1940

2,200,354

UNITED STATES PATENT OFFICE 2,200,354

GLASS CLEANING FLUID AND THE MANUFACTURE THEREOF

Frederic L. Bishop, Jr., Jeannette, Pa., assignor to American Window Glass Company, Pittsburgh, Pa., a corporation of Pennsylvania No Drawing. Continuation of application Serial No. 60,699, January 24, 1936. This application April 12, 1939, Serial No. 267,449

8 Claims. (Cl. 87—5)

The present invention relates to glass cleaning fluids and the manufacture thereof and more particularly to glass cleaning fluids to be used in the cleaning of glass sheets which are to be used in the manufacture of laminated glass.

In the manufacture of laminated glass it is ordinarily necessary to clean the glass sheets thoroughly and carefully before they can be satisfactorily united to the layer of strengthening material. Some commercial laminated glass has been made by interposing a preformed sheet of strengthening material between the glass sheets and securely uniting it thereto by adhesives of various types. In other practices commercial laminated glass has been made by placing a layer of strengthening material in liquid form on each of two glass sheets to be united together and then drying the films and forming the sandwich by bringing the two filmed or coated surfaces together. It is quite important in both of these processes that the glass sheets be thoroughly cleaned before the strengthening material is united thereto. Considerable difficulty has been experienced heretofore in both of these processes in getting the glass sheets sufficiently clean to obtain a satisfactory bond between the strengthening material and the sheets. The percentage of rejects due to unsatisfactory cleaning and therefore improper adhesion between the component parts of the sandwich has been relatively high.

In both the preformed sheet process and the liquid process the glass sheets are cleaned by means of various types of cleaning machines adapted to brush or scrub the sheets. In some such machines water is supplied to the glass sheets and the sheets thoroughly scrubbed by appropriate brushing apparatus. This type of cleaning removes the dust, dirt and grease from the glass sheets but despite cleaning of this character the glass sheets are not sufficiently cleaned to permit satisfactory bonding between the strengthening material and the glass sheets. Chemical cleaning has been resorted to in order to more effectively clean the glass sheets so as to permit proper adhesion but all of the chemical cleaning methods employed prior to my invention were entirely unsuccessful so far as I am aware.

In addition to the various cleaning or washing methods employed for cleaning sheets of glass to be used in the manufacture of laminated glass attempts have been made to utilize various known commercial chemical cleaners such as dichloroethyl ether after the glass sheets have been cleaned as thoroughly as possible by the usual washing operation but these attempts were entirely unsuccessful and did not result in a satisfactory cleaning of the sheets. Let-goes and other defects continued to form in the manufactured product.

By the present invention I provide a cleaning fluid and a method of manufacturing the same, the cleaning fluid being of such character as to effectively clean the glass sheets so that proper adhesion can be obtained between the sheets and the layer or layers of strengthening material interposed therebetween. The cleaning fluid which I provide is the product obtained from reacting either an ether of the group consisting of dichloroethyl ether and chlor-ethoxy-chlor-ethyl ether or ethylene chlorohydrin with a metal of the group consisting of ferrous metals, tin and aluminum or from mixing dichloroethyl ether and ferrous oxylate. It may be prepared in any of the ways set forth in the following examples but it will be obvious to those skilled in the art that it may be prepared in various other ways:

*Example I.*—Dichloroethyl ether and steel wool are placed in a container and the dichloroethyl ether heated up gradually in the presence of wool to approximately 300° F. for a period of one and one-half hours. It is then boiled for about three hours and the liquid then allowed to cool. If the boiling is carried out for an appreciable period of time longer than three hours, for example, six hours, the liquid will work satisfactorily as a cleaner for the glass sheets but it is quite difficult to remove it from the sheets. In view of the difficulty of removing it from the glass sheets a boiling period of less than six hours is preferable.

*Example II.*—Dichloroethyl ether may be boiled in the presence of tin. Preferably the boiling of the ether with the tin is accomplished in the manner set forth in Example I.

*Example III.*—Dichloroethyl ether may be boiled in the presence of aluminum. In this connection also the heating and boiling is preferably carried out in the manner set forth in Example I.

*Example IV.*—The dichloroethyl ether may be permitted to otherwise age in the presence of a metal of the group consisting of ferrous metals, tin and aluminum. For example, it may be permitted to stand in an open container in the presence of such a metal for a sufficient period of time to effect a reaction between the metal and the ether.

*Example V.*—Dichloroethyl ether may be mixed with ferrous oxylate in the presence of an accelerator such as hydrochloric acid. These ingredients may be mixed in the approximate proportion of 97 parts of dichloroethyl ether to 2 parts of ferrous oxylate and 1 part of hydrochloric acid. It is not necessary to use hydrochloric acid as it merely functions as an accelerator. I have found that a satisfactory cleaning fluid can be obtained without the use of any accelerator and by merely mixing the ingredients mentioned above.

Instead of dichloroethyl ether referred to in the examples above, an entirely satisfactory cleaning fluid can be obtained by substituting the following ether or chlorine compound for the dichloroethyl ether in the examples:

Ethylene chlorohydrin
Chlor-ethoxy-chlor-ethyl ether

In Examples I to III I have stated that I preferably gradually heat the ether to the boiling point and maintain it at the boiling point for a period of approximately three hours. My invention is not limited to the use of such an extended heating and boiling of the ether or chlorine compound in the presence of the metals specified, the periods mentioned being set forth only by way of example. Entirely satisfactory results can be obtained where a shorter boiling period is utilized and, in fact, even where the ether or chlorine compound is not brought to the boiling point. Where the ether or chlorine compound is not boiled the heating will have to be continued for a longer period of time. In any event it is merely necessary to carry out the aging of the ether or chlorine compound in the presence of the metals specified for a sufficient period of time to effect a reaction between the metal and the ether or chlorine compound.

Attempts have been made to ascertain with reasonable exactness the character of the reaction which takes place between the metal and the ether or chlorine compound but it has been impossible to do so. It is definitely known, however, that the cleaning fluid which I provide is a reaction product because the dichloroethyl ether changes color and a precipitate is formed during the manufacture thereof. It is also definitely known that the resulting cleaning fluid differs materially from the ether or chlorine compound utilized because the reaction product obtained will effectively clean the glass sheets to be used in the manufacture of laminated glass whereas the ethers or chlorine compounds will not do so.

In the use of the cleaning fluid provided by my invention, the fluid is flowed, sprayed or otherwise applied on the glass sheets and preferably allowed to remain there for only a relatively short period of time, for example, 5 to 20 seconds. Thereafter, the glass sheets are flushed with water or again passed through the ordinary glass cleaning machines of the types which are well-known in this art.

While I have referred to the fluid which I provide as a cleaning fluid, I do not necessarily mean that it functions to remove grease, dirt and the like which is on the surface of the glass sheet. The prior art cleaning processes and machines have been satisfactory for removing dirt, grease and the like from the sheets but, as stated above, even when thoroughly cleaned by such processes the glass sheets are not satisfactory for use in the manufacture of laminated glass. I have found that it is necessary to clean the glass sheets by the use of the cleaning fluid which I provide even after they are cleaned by known methods. Although it is quite difficult to advance any satisfactory theory as to why the cleaning fluid which I provide functions satisfactorily, I believe that it either reacts chemically to some slight extent with the glass or eliminates from the surface of the glass impurities which are of such character as to prevent satisfactory adhesion between the strengthening material and the glass sheets. Again, the cleaning fluid which I provide may leave a coating or film on the glass sheet which is even too thin to be visible to the eyes and such a film may remain on the glass sheet even when subjected to a subsequent cleaning or flushing treatment. This film may be of such character as to tend to cause adhesion between the glass sheet and the strengthening material. Any of the theories expressed may be correct. Attempts have been made to determine the proper explanation of the phenomena but it has been impossible to prove the correctness of any one of these theories.

While I have described several ether and chlorine compounds which may be used and while I have described several ways in which cleaning fluid may be manufactured, I do not intend that my invention shall be limited to these specific ethers or chlorine compounds or specific metals recited as my invention may be otherwise employed within the scope of the appended claims.

The present application is a continuation of my application, Serial No. 60,699, filed January 24, 1936.

I claim:

1. As a fluid for cleaning glass sheets to be used in the manufacture of laminated glass, the product which results from subjecting an ether of the group consisting of dichloroethyl ether and chlorethoxy-chlor-ethyl ether in the presence of a metal of the group consisting of ferrous metals, tin and aluminum to the required degree of temperature and for the period of time necessary to effect such a reaction therebetween that the ether changes color and a precipitate is formed.

2. As a fluid for cleaning glass sheets to be used in the manufacture of laminated glass, the product resulting from boiling dichloroethyl ether in the presence of a metal of the group consisting of ferrous metals, tin and aluminum for a period of time at least sufficient to effect such a substantial reaction therebetween that the dichloroethyl ether changes in color and a precipitate is formed.

3. A process for the manufacture of a fluid for cleaning glass sheets to be used in the manufacture of laminated glass which consists in subjecting dichloroethyl ether in the presence of a metal of the group consisting of ferrous metals, tin and aluminum to the required degree of temperature and for the period of time necessary to effect such a reaction therebetween that the ether changes in color and a precipitate is formed.

4. A process for the manufacture of a fluid for cleaning glass sheets to be used in the manufacture of laminated glass which consists in subjecting an ether of the group consisting of dichloroethyl ether and chlor-ethoxy-chlor-ethyl ether in the presence of a metal of the group consisting of ferrous metals, tin and aluminum to the required degree of temperature and for the period of time necessary to effect such a reaction therebetween that the ether changes in color and a precipitate is formed.

5. A process for the manufacture of a fluid for cleaning glass sheets to be used in the manufacture of laminated glass which consists in heating an ether of the group consisting of dichloroethyl ether and chlor-ethoxy-chlor-ethyl ether together with a metal of the group consisting of ferrous metals, tin and aluminum to approximately the boiling point, supplying additional heat sufficient to cause the liquid to boil for a period of approximately three hours, and thereafter permitting the liquid to cool.

6. A process for the manufacture of a fluid for cleaning glass sheets to be used in the manufacture of laminated glass which consists in boiling an ether of the group consisting of dichloroethyl ether and chlor-ethoxy-chlor-ethyl ether together with a metal of the group consisting of ferrous metals, tin and aluminum for a period of approximately three hours, and thereafter permitting the liquid to cool.

7. A cleaning fluid for cleaning glass sheets to be used in the manufacture of laminated glass consisting of the product resulting from mixing a predominant proportion of dichloroethyl ether, a relatively small proportion of ferrous oxylate, and hydrochloric acid in an amount sufficient to accelerate the reaction.

8. A fluid for cleaning glass sheets to be used in the manufacture of laminated glass consisting of the product resulting from mixing a predominant proportion of an ether of the group consisting of dichloroethyl ether and chlor-ethoxy-chlor-ethyl ether with a relatively small proportion of ferrous oxylate and hydrochloric acid in an amount sufficient to accelerate the reaction.

FREDERIC L. BISHOP, Jr.